Oct. 12, 1971  C. F. FOLEY ET AL  3,611,629
ATTACHABLE WHEELS PLASTIC BLOCKS
Filed Jan. 28, 1970
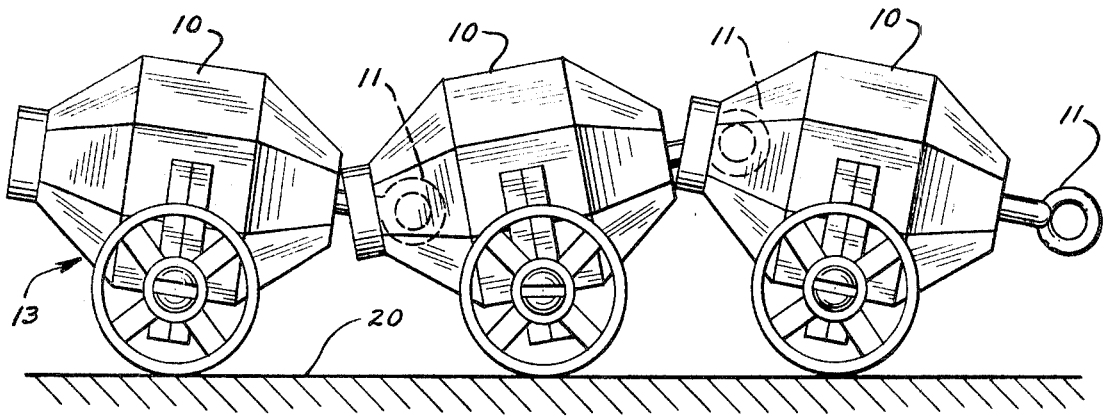
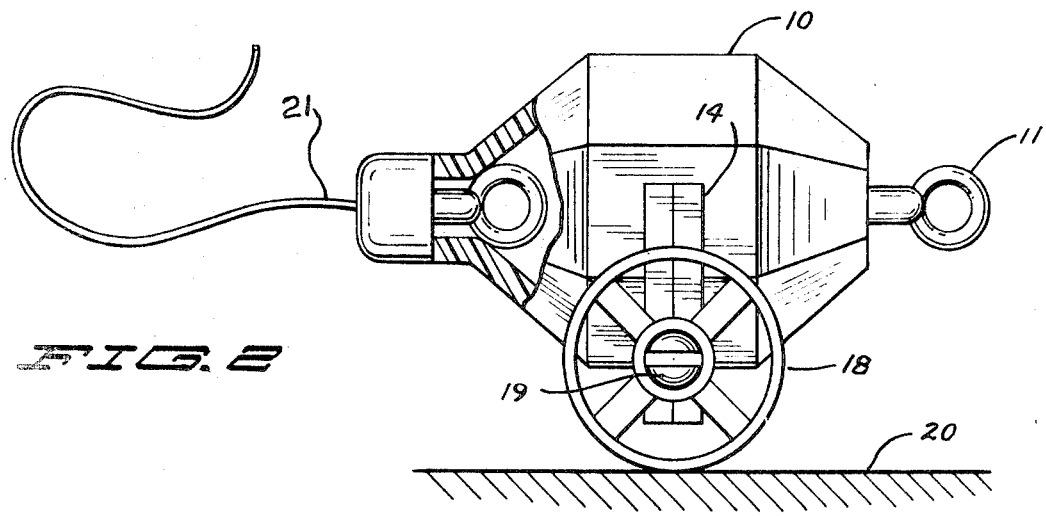
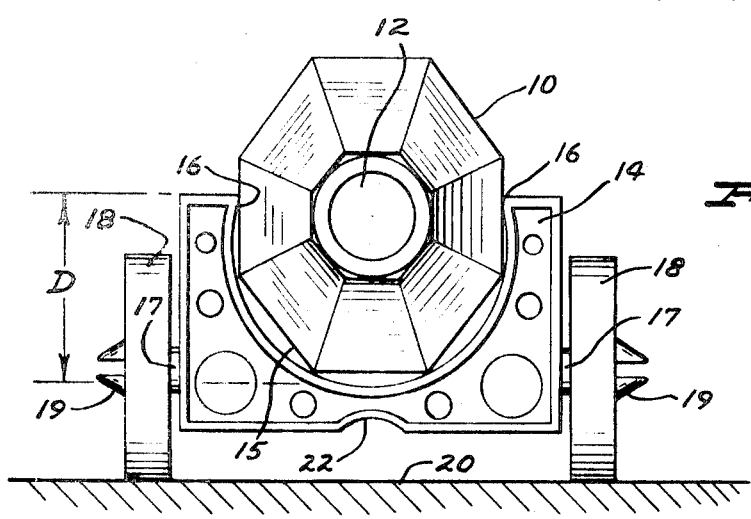
INVENTORS
CHARLES F. FOLEY
BY CHARLES D. MCCARTHY
*Dugger Peterson Johnson & Westman*
ATTORNEYS

United States Patent Office 3,611,629
Patented Oct. 12, 1971

3,611,629
ATTACHABLE WHEELS FOR PLASTIC BLOCKS
Charles F. Foley, 3908 Merriam Road, Minnetonka, Minn. 55343, and Charles D. McCarthy, Rte. 3, Box 217BA, Deephaven, Minn. 55391
Filed Jan. 28, 1970, Ser. No. 6,437
Int. Cl. A63h *11/10*
U.S. Cl. 46—201                                                 8 Claims

ABSTRACT OF THE DISCLOSURE

A wheel assembly which can be snapped onto plastic blocks, commonly known as "pop beads" or "pop blocks" to make trains or vehicles out of a string of the blocks.

SUMMARY OF THE INVENTION

The present invention relates to a unit for mounting onto pop beads or blocks which has wheels and which will snap onto the beads so that a string of beads can be made into a toy train or other vehicular plaything. The mounting member for the beads is made so that it will grip the bead or block to hold the bead securely to prevent it from coming loose, and from swiveling in the wheel mounting member.

BRIEF DESCRIPTION OF THE DRAWINGS

FIG. 1 is a side elevational view of a plurality of plastic pop beads of the snap together type shown with the wheels made according to the present invention installed thereon;

FIG. 2 is an enlarged side elevational view of a single pop bead of the device of FIG. 1; and FIG. 3 is an end elevational view of the device of FIG. 2.

DESCRIPTION OF THE PREFERRED EMBODIMENT

In toy plastic pop beads, it is well known that the beads are made so that they can be snapped together or pulled apart through the use of fastening members so that long strips of these beads can be utilized. Shown in FIG. 1 there are plastic beads or blocks 10. These beads are hollow and have fastening members 11 at one end thereof and receptacles comprising openings 12 (see FIG. 3) at the opposite end thereof so that the fastening member 11 of one bead can be slipped into the opening of an adjacent bead, and the beads will be held together. The beads can be popped apart when pulled firmly, so that they can be used individually, or the beads can be made into long strips. The beads or blocks 10 as shown are hollow and are octagonal in shape, although the beads can by cylindrical, spherical or any unusual cross sectional shape desired and they will still be usable.

The device of the present invention comprises a wheel assembly illustrated generally at 13 which has a mounting member 14. The mounting member is provided with an interior recess 15. As shown the mounting member is wider than the bead 10 itself in transverse width, and as far as the longitudinal length is concerned, it is just sufficiently long to give some support to the block. The receptacle 15 is made so that the upper edge surface portions defining the receptacle and indicated at 16 are of smaller diameter or transverse dimension than the bead which is to be mounted in the receptacle. Also, the distance (D) from the bottom of the receptacle to the facing corner surface portions 16, is made so that it goes up more than half way on the bead, or in other words the engagement of the surfaces is above the median point of the bead.

The mounting member 14 has axles 17 protruding from opposite edges thereof, and wheels 18 are rotatably mounted in these axles. Suitable wheel keepers 19 are provided so that the wheels can snap onto the axles and will be retained in place. The axle assembly is made to give at its center portion, indicated at 22, so the corner surface portion 16 can be expanded outwardly to fit onto slightly oversize beads, and still grip them adequately without crushing the sides of the beads.

The beads 10 are individually snapped into the receptacle 15 of a separate one of the mounting members 14 and then the beads can be snapped together as shown in FIG. 1 to form a train. They can be pulled over the ground by the children for playing, and the attachment greatly increases the versatility and usability of the blocks. The normal fit for the beads is loose, so adjacent beads tilt or cock slightly relative to each other. When pulled, the string of beads wiggle and bounce in a pleasing and entertaining manner. The wheels do not have to be snapped onto every block, but if desired, they can be. A suitable pull string and fitting 21 can be used for pulling the train of blocks over a support surface illustrated at 20. The string is attached to a member that snaps into the opening on the end bead and can be molded from plastic.

Looseness or sag at the junction of the beads, if not excessive, enhances the wiggling, bouncing and interesting action of the string of beads.

The beads or blocks can be used in 2's or 3's or more.

What is claimed is:

1. A wheel assembly for a toy plastic pop bead comprising a mounting member, a receptacle defined in said mounting member and being of size to receive said pop bead, means adjacent the upper portions of said mounting member frictionally engaging the side surfaces of said pop bead, and wheel means rotatably mounted on said mounting member about an axis transverse to the longitudinal axis of the bead.

2. In combination with a plurality of toy blocks connected to form a string of blocks, the improvement comprising a separate wheel assembly mounted on at least two of said blocks, said wheel assembly including a mounting member, wheel means rotatably mounted on opposite sides of said mounting member, means defining a receptacle in said mounting member said receptacle having surfaces frictionally engaging the surfaces of said blocks when said blocks are inserted in said receptacles of the mounting members.

3. The device of claim 2 wherein the means defining said receptacle includes facing surface portions adjacent the upper portions of said receptacle wherein the surface portions are closer together than the outer side surfaces of the block which engage the facing surface portions when the block is in position in the receptacle.

4. The combination as specified in claim 2 wherein said blocks have a generally elongated shape with a section thereof which is adapted to fit within the receptacle in said mounting member.

5. The combination as specified in claim 2 wherein the facing surface portions of each mounting member engage the side surfaces of its associated block more than half way up on the side surfaces of the associated block when the block is seated against the lower portions of the receptacle.

6. The combination as specified in claim 2 wherein said mounting member includes a flexible portion in the center thereof, thereby permitting said facing surface portions to be spread apart without substantially increasing the clamping force between the facing surface portions.

7. The combination as specified in claim 2 and a pull string assembly including means removably fastening said pull string assembly to an end one of said blocks.

8. In combination with a toy pop bead, a mounting member, a receptacle defined in said mounting member and being of size to receive said pop bead, means on the mounting member to retain said pop bead in said receptacle, and wheel means rotatably mounted on said mounting member about an axis to support said pop bead for movement along a surface.

References Cited

UNITED STATES PATENTS

| | | | |
|---|---|---|---|
| 2,661,573 | 12/1953 | Onley | 46—201 |
| 2,693,051 | 11/1954 | Cavanagh | 46—201 |

LOUIS G. MANCENE, Primary Examiner

D. L. WEINHOLD, JR., Assistant Examiner